United States Patent [19]

Pennanen et al.

[11] Patent Number: 4,713,103

[45] Date of Patent: Dec. 15, 1987

[54] METHOD OF AND A DEVICE FOR APPLYING A PRIMARY COATING TO AN OPTICAL FILAMENT

[75] Inventors: Risto Pennanen; Jyrki Pennala, both of Helsinki, Finland

[73] Assignee: Oy Nokia AB, Helsinki, Finland

[21] Appl. No.: 938,252

[22] Filed: Dec. 5, 1986

[30] Foreign Application Priority Data

Dec. 17, 1985 [FI] Finland ................................ 855012

[51] Int. Cl.$^4$ ........................ C03B 37/023; B05D 5/06
[52] U.S. Cl. ...................................... 65/3.11; 65/3.44;
65/11.1; 118/405; 427/163; 427/434.5
[58] Field of Search ....................... 65/3.11, 3.13, 3.44,
65/11.1; 427/163, 434.5; 118/405

[56] References Cited

U.S. PATENT DOCUMENTS

| 4,208,200 | 6/1980 | Claypoole et al. | 65/11.1 |
|---|---|---|---|
| 4,349,587 | 9/1982 | Aloisio et al. | 427/163 |
| 4,409,263 | 10/1983 | Aloisio et al. | 427/163 |
| 4,439,467 | 3/1984 | Kassahun et al. | 427/163 |
| 4,455,159 | 6/1984 | Lamb et al. | 65/3.11 |
| 4,531,959 | 7/1985 | Kar et al. | 65/3.11 |
| 4,539,226 | 9/1985 | Paek et al. | 427/163 |
| 4,594,088 | 6/1986 | Paek et al. | 65/11.1 X |
| 4,608,276 | 8/1986 | Lamb et al. | 65/3.11 X |

*Primary Examiner*—Robert L. Lindsay
*Attorney, Agent, or Firm*—Finnegan, Henderson, Farabow, Garrett & Dunner

[57] ABSTRACT

A method and a device for applying a primary coating to an optical filament. In order to make the distribution of the coating material even, the flow of the coating material to be introduced into the crucible is divided in the crucible into two flows opposite in direction and advancing in the peripheral direction of the crucible. The two flows are caused to flow in the axial direction substantially at the opposite sides of the crucible. The axial flows are caused to flow in the peripheral direction of the crucible and joined by means of an outer channel extending around the crucible in the peripheral direction thereof. The flow is passed radially through throttle openings into an inner peripheral channel and further through a peripheral throttle slot into a conical channel along which it is led into a central chamber of the crucible, through which chamber the filament is drawn.

10 Claims, 9 Drawing Figures

METHOD OF AND A DEVICE FOR APPLYING A PRIMARY COATING TO AN OPTICAL FILAMENT

The invention relates to a method of applying a primary coating to an optical filament by passing a filament coming from a drawing furnace through a coating crucible into which a coating material is fed for applying it to the surface of the filament and by passing the coated filament, after the coating is hardened, over an idler wheel through a drawing apparatus on to a coil. The invention is also concerned with a device suitable for applying said method.

BACKGROUND OF THE INVENTION

The manufacture of filaments suited for optical data transmission comprises drawing of a so called preform which is formed of a glass material, usually of a glass rod made of an alloyed quartz and collapsed by heating after a gas treatment, and drawn particularly in a drawing furnace into a thin filament. In order to protect the surface of the filament from getting scratched during subsequent handling before the filament is coated with a secondary coating, it is known to apply a primary coating to the filament immediately after it is drawn.

The primary coating affects the properties of the filament to a great extent as even minor scratches and other such figures impair the strength properties of the filament. Therefore the primary coating has to surround the filament at all points if the aimed final result is to be obtained. The centricity of the primary coating is also of great importance because an acentric structure, i.e. a structure in which the thickness of the coating varies in the peripheral and longitudinal direction of the filament, results in poor thermal properties, for instance.

A great number of solutions have been developed for the formation of the primary coating. One typical solution is the use of an open crucible. In this known procedure the filament is drawn through a crucible filled with a coating material, with the result that the coating material adheres to the surface of the filament. An example of such solutions would be the procedure disclosed in U.S. Pat. No. 4,349,587. However, a method utilizing an open crucible is restricted in that the drawing speed of the filament cannot be made sufficiently high.

In an attempt the achieve higher drawing speeds, pressurized crucibles have later been taken into use. By means of such crucibles, it has been possible to considerably increase the drawing speed as compared to open systems. With an increased drawing speed, the drawbacks of an acentric coating have caused problems. To achieve improvement in this matter, various solutions have been brought out to extremely, accurately guide the filament and to cause the coating material to be distributed on the surface of the filament as evenly as possible.

Another example of prior art solutions would be the procedure disclosed in U.S. Pat. No. 4,409,263, wherein coating material is introduced into a crucible under a pressure such that an upward flow of the coating material is formed, and no disadvantageous air bubbles are carried with the filament moving at a high speed. The solution according to U.S. Pat. No. 4,409,263, however, has a disadvantage that it is complicated in structure and operation, whereby the reliability of its operation is not the best possible. Said patent takes no account of the symmetric distribution of the coating material for improving the centricity of the coating.

U.S. Pat. No. 4,439,467 teaches a symmetric material distribution in which the material is introduced into the chamber through a plurality of holes. In this case, too, the material is introduced into the orifice through a fixed number of holes so that an optimal evenness is not obtained. Furthermore, the connection is carried out by means of several bolts wherefore it is difficult to ensure that the temperature of the material is even. It is to be noted that the viscosity varies with the temperature and so possibly does the centricity, too. One further disadvantage is the variation of the pressure (impurities in the channels, manufacturing tolerances, differences in pipe lengths), which affects adversely the symmetrical material distribution, thus resulting in an inferior centricity.

SUMMARY OF THE INVENTION

The object of the invention is to provide a method and a device by means of which the drawbacks of the prior art can be obviated. This is achieved by means of the method and the device according to the invention: the method according to the invention being characterized in that the flow of the coating material to be introduced into the coating crucible is divided in the crucible into two flows opposite in direction and advancing in the peripheral direction of the crucible;

the two flows are caused to flow in the axial direction substantially on the opposite sides of the crucible;

the axial flows are caused to flow in the peripheral direction of the crucible, joined by means of an outer channel extending around the crucible in the peripheral direction, and passed radially through throttle openings into an inner peripheral channel;

the material is passed from the inner peripheral channel through a peripheral throttle slot into a conical channel along which the material is guided into a central chamber of the crucible, through which chamber the filament is drawn. The device according to the invention, in turn, is characterized in that a cylindrical insert is fitted inside the cylindrical vessel, the outer periphery of said insert having at least one groove formation comprising a first groove extending substantially over 180° on the outer face of the insert and adjacent said first groove a second groove extending around the insert;

the first and the second groove are joined adjacent the ends of the first groove by means of axial grooves, said groove formation being arranged to form a channel together with the inner face of the cylindrical vessel;

the bottom of the second groove is provided with uniformly spaced openings leading into an inner peripheral channel defined between the orifice parts fitted inside the insert and the inner face of the insert, the inner edge of said inner peripheral channel being provided with a peripheral throttle slot through which the coating material, after it is fed substantially at the mid point of the first groove and through the first and the second groove and the openings and the peripheral channel, is arranged to flow into a conical channel and further into a central chamber through which the filament is arranged to be drawn.

The invention is advantageous mainly in that due to the symmetric material distribution the primary coating has a high centricity, so that the quality of the final product is improved. The drawing speeds of the filament can be high, because the coating material is distributed extremely evenly. The method and the device according to the invention can also be applied advantageously when a filament is coated simultatenously with two or more different coating materials in more than one layers. Further, the device according to the invention is fairly simple and extremely reliable in operation, so that the manufacturing and operating costs are extremely low.

A further advantage is the symmetric material distribution, and that the pressure is stable on the periphery of the orifices, too. The influence of the pressure loss caused by the material flow is more marked at high flow rates, i.e. with high drawing speeds of the filament. In spite of the symmetric material distribution, the material is introduced into the crucible through a single channel. The material is introduced into the central chamber through a continuous slot provided at the upper edge of the central chamber whereas a fixed number of holes is used in the known method.

BRIEF DESCRIPTION OF THE DRAWINGS

The invention will be described in the following by means of one preferred embodiment described in the attached drawing, whereby.

DETAILED DESCRIPTION OF THE INVENTION

Figure 1:
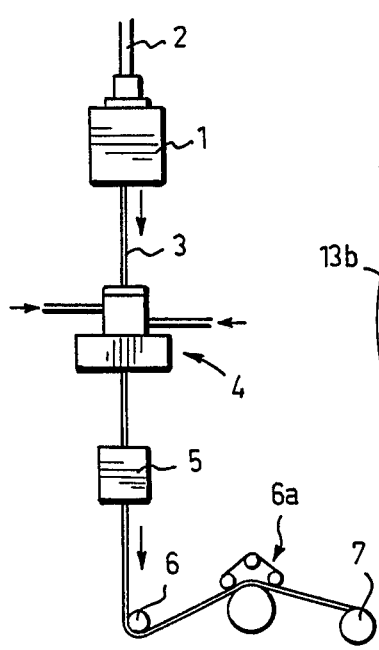
FIG. 1 is a general view of the manufacture of an optical filament, wherein the invention is utilized.

FIG. 1 shows a drawing furnace indicated by means of the reference numeral 1, a preform 2 being passed into said furnace from above. The preform is heated and drawn into a thin filament 3 in the drawing furnace 1. The filament 3 is passed from the drawing furnace 1 into a crucible 4 in which a primary coating is applied to the filament. After the crucible 4, the filament provided with the primary coating is led into an appratus 5 in which the coating material is hardened. After the coating material is hardened, the filament is passed over an idler wheel 6 and through a drawing device 6a coil 7.

The invention relates to the method and the device part, i.e. the crucible 4, used in the formation of the primary coating. In other respects the process according to FIG. 1 is completely obvious to one skilled in the art, so these matters are not more closely described here. However, the process of FIG. 1 is only to be seen as a simplified specific example illustrated of the field of application of the invention.

Figure 3:
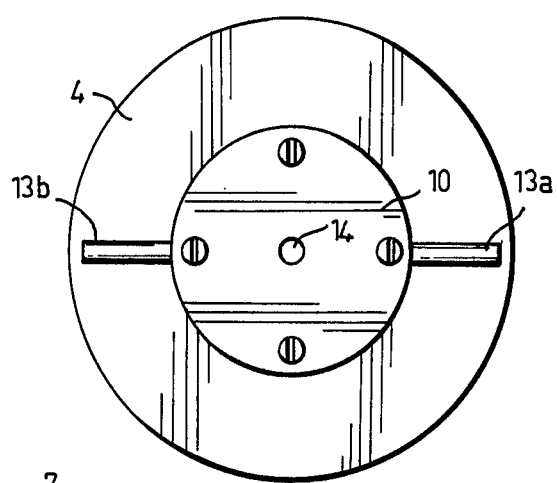
FIG. 3 is a top view of the device of FIG. 2.
Figure 2:
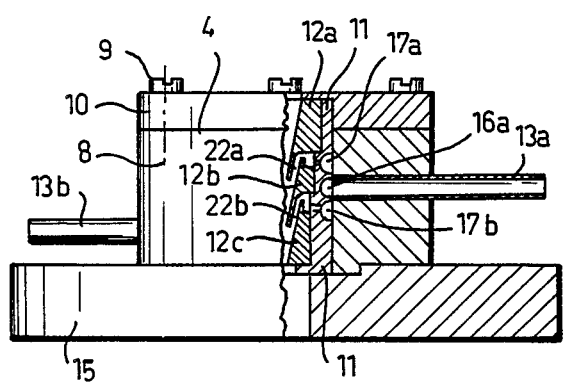
FIG. 2 is a partial sectional side view of one embodiment of the filament coating device according to the invention.

FIGS. 2 and 3 illustrate one preferred embodiment of the device according according to the invention, i.e. the coating crucible 4. The crucible according to FIGS. 2 and 2 comprises a body, i.e. a cylindrical vessel which is formed by a body portion 8. In addition, a cover 10 is fastened on the body portion by means of screws 9. A cylindrical insert 11 and orifice parts 12a, 12b and 12c are positioned within the body. The crucible is further provided with guides 13a, 13b for guiding the coating material. An opening 14 is provided on the axis of symmetry of the crucible, the filament being passed into the crucible through said opening. The orifice parts and the lower portion of the crucible are, of course, provided with openings at respective points so that the filament can be drawn through. The crucible is supported in position by means of a supporting structure 15.

The structure of the insert 11, which is fitted inside the body, is illustrated in FIGS. 4 to 8. The outer periphery of the insert 11 comprises two groove formations, each having a first groove 16a, 16b which reaches substantially over 180° on the outer face of the insert. Each groove formation comprises adjacent the first groove a second groove 17a, 17b which reaches around the insert. The grooves 16a and 17a and the grooves 16b and 17b are interconnected adjacent the ends of the first groove by means of axial grooves 18a, 18b. The two groove formations formed as described above are arranged to form a channel for the coating material together with the inner face of the cylindrical vessel. The guides 13a, 13b of the crucible introduce the coating material into the channels formed like this, which guides open substantially at the mid point of the first grooves 16a, 16b, as appears from the figures.

Figure 2A:
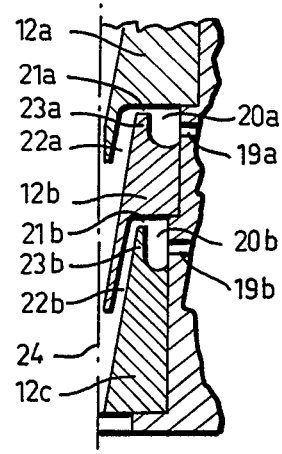
FIG. 2a illustrates one detail of FIG. 2 on an enlarged scale.
Figure 4:
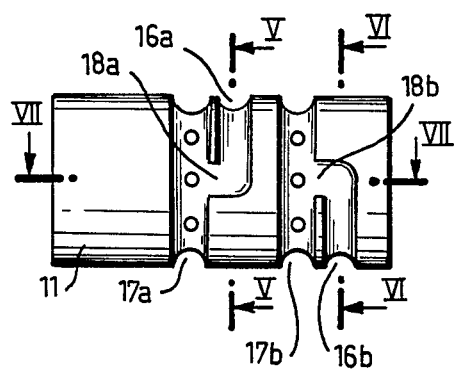
FIG. 4 is a general side view of a cylindrical insert used in the embodiment of FIGS. 2 and 3.
Figure 5:
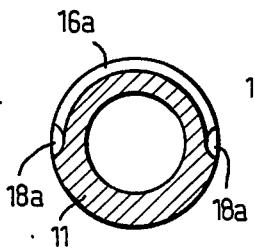
FIG. 5 shows a section along the arrows V—V shown in FIG. 4.
Figure 6:
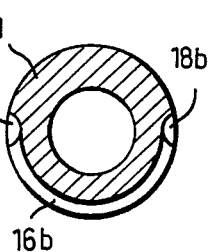
FIG. 6 shows a section along the arrows VI—VI shown in FIG. 4.
Figure 7:
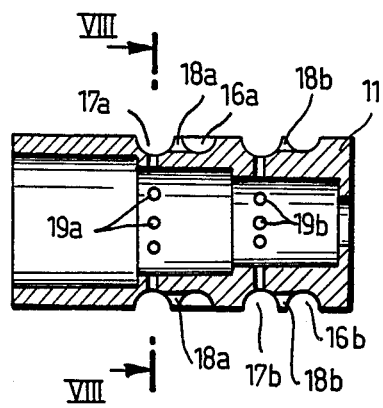
FIG. 7 shows a section along the arrows VII—VII shown in FIG. 4.
Figure 8:
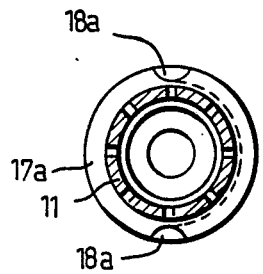
FIG. 8 shows a section along the arrows VIII—VIII shown in FIG. 7.

Openings 19a, 19b are formed on the bottom of the second groove 17a, 17b at regular intervals. Said openings 19a, 19b, the orifice parts 12a, 12b, 12c fitted inside the insert 11, and the inner face of the insert 11 define therebetween a peripheral inner channel 20a, 20b shown in FIGS. 2 and 2a. A throttle slot 21a, 21b is formed to extend radially inwards from the peripheral channel 20a, 20b, which throttle slot is formed by means of the inner surfaces of the orifice parts 12a, 12b, 12c fitted one upon another and partly within each other. Conical channels 22a, 22b reaching from the throttle slot 21a, 21b towards the central chamber 24 of the crucible are formed in a similar way. Thereby e.g. the throttle slot 21a is formed by the lower surface of the flange portion of the upper orifice 12a and the peripheral overflow edge 23a of the intermediate orifice 12b, etc. Correspondingly, the throttle slot 21b is formed by the lower surface of the flange portion of the intermediate orifice 12b and the peripheral overflow edge of the lower orifice 12c, etc. The central chamber of the crucible means that portion of the crucible through which the filament is arranged to be drawn. In the case of FIG. 1, for example, the central chamber is positioned substantially on the vertical axis of symmetry of the crucible, because the filament is drawn vertically downward through the crucible.

The device shown in FIGS. 2 to 8 is used for applying the method according to the invention in the following way. The coating material, e.g. epoxy acrylate, silicone acrylate, or urethane acrylate, is applied through the guides 13a, 13b under pressure radially in the middle of the first groove 16a, 16b. The coating material can be fed by means of a mechanism not shown from a reservoir not shown in the figures. At the junction point of the guides 13a, 13b and the grooves 16a, 16b, the flow is divided into two flows opposite in direction as it flows in the channel formed by the groove 16a, 16b in two opposite directions along the outer periphery of the insert. Thereafter both flow portions are caused to flow in the axial direction of the insert by means of the channels 18a, 18b. These axial flows are again caused to flow in the peripheral direction of the insert in the outer channels formed by the grooves 17a, 17b. In other words, the two flow portions of each feed flow are rejoined into a single flow at this stage. From the outer channel formed by the groove 17a, 17 the flow is passed through the throttle openings 19a, 19b into the inner peripheral channel 20a, 20b defined between the orifice parts 12a to 12c fitted inside the insert 11, and the inner face of the insert. From the channel 20a, 20b the material is passed through the throttle slot 21a, 21b into a conical channel 22a, 22b and further into the central chamber 24 of the crucible, wherein the coating material is applied evenly to the surface of the filament when it is drawn through the central chamber 24.

It is obvious that the level of the coating material in the central chamber or in the orifice positioned above it may rise and fall when the feed of the coating material is carried out as described above. This can be eliminated by adjusting the delivery pressure by means of a pressure feed back so that the surface can be maintained at a constant level, if required.

The above example is by no means intended to restrict the invention, but the invention can be modified within the scope of the claims in various ways. Accordingly, it is to be understood that the device according to the invention or the parts thereof do not need to be exactly similar to those shown in the figures, but other kinds of solutions are possible as well. The invention does not restrict the number of the coating materials; it can be applied when coating with one, two, three or more different materials. Naturally, the number of the feed guides, the groove formations on the insert and the orifice parts must be adjusted according to the requirements in each particular case. It is thereby also possible that the insert, e.g., is module-like, each module having a groove formation such as described above, e.g. 16a, 17a, 18a, for one coating material, etc. Further, it is not always necessary that the throttle slots equals in size, but their size can be chosen as required. The orifice parts, the intermediate orifices in particular, thereby have to be locked in place within the insert so that the throttle slots maintain the desired size. The throttle slots can also be adjustable so that one and same crucible can be used for coating with different kinds of mateials. In the examples of the figures, it is thereby possible that e.g. the intermediate orifice is locked in place in a suitable way, and the upper and lower orifices can be axially adjustable from outside the crucible. The intermediate orifices can be kept in place by means of the pressures of the coating material, as is illustrated generally in the solution of FIG. 2a. The intermediate orifice 21b is maintained in place if the pressure prevailing in the channel 20a is at least equal to the pressure prevailing in the channel 20b.

What is claimed is:

1. A method of applying a primary coating to an optical filament by passing a filament coming from a drawing furnace through a coating crucible into which a coating material is fed for applying it to the surface of the filament and by passing the coated filament, after the coating is hardened, over an idler wheel through a drawing apparatus on to a coil, wherein
    the flow of the coating material to be introduced into the coating crucible is divided in the crucible into two flows opposite in direction and advancing in the peripheral direction of the crucible;
    the two flows are caused to flow in the axial direction substantially on the opposite sides of the crucible;
    the axial flows are caused to flow in the peripheral direction of the crucible, joined by means of an outer channel extending around the crucible in the peripheral direction, and passed radially through throttle openings into an inner peripheral channel; and
    the material is passed from the inner peripheral channel through a peripheral throttle slot into a conical channel along which the material is guided into a central chamber of the crucible, through which chamber the filament is drawn.

2. A method according to claim 1, wherein the peripheral throttle slot leading out from the inner peripheral channel, and the conical channel are formed by means of the outer and inner surfaces of substantially concial orifice parts positioned one upon another partly within each other.

3. A method according to claim 2, wherein the throttle slot is formed by means of a peripheral overflow edge of a lower orifice part and the lower surface of the flange portion of an upper orifice part.

4. A method according to claim 1, wherein the upper surface of the coating material in the crucible is maintained at a predetermined level by adjusting the delivery pressure of the flow of the coating material to be introduced into the coating crucible by means of a pressure feed back.

5. A device for applying a primary coating to a filament, through which device a filament coming from a drawing furnace is arranged to be passed and into which device a pressurized coating material is arranged to be fed for applying it to the surface of the filament, said device comprising a substantially cylindrical vessel within which orifice means are fitted for the distribution of the coating material on the surface of the filament, wherein
    a cylindrical insert is fitted inside the cylindrical vessel, the outer periphery of said insert having at least one groove formation comprising a first groove extending substantially over 180° on the outer face of the insert and adjacent said first groove a second groove extending around the insert;
    the first and the second groove are joined adjacent the ends of the first groove by means of axial grooves, said groove formation being arranged to form a channel together with the inner face of the cylindrical vessel;
    the bottom of the second groove is provided with uniformly spaced openings leading into an inner peripheral channel defined between the orifice parts fitted inside the insert and the inner face of the insert, the inner edge of said inner peripheral channel being provided with a peripheral throttle slot through which the coating material, after it is fed substantially at the mid point of the first groove and through the first and the second groove and the openings and the peripheral channel, is arranged to flow into a conical channel and further into a central chamber through which the filament is arranged to be drawn.

6. A device according to claim 5, wherein the throttle slot, leading out from the inner peripheral channel, and the conical channel are formed by means of the outer and inner surfaces of substantially conical orifice parts fitted within each other.

7. A device according to claim 6, wherein the throttle slot is formed by means of a peripheral overflow edge of a lower orifice part and the lower surface of the flange portion of an upper orifice part.

8. A device according to claim 5, wherein
the insert fitted inside the cylindrical vessel comprises two groove formations formed by a first and a second groove and an axial groove and positioned one after another in the axial direction; and
three orifice parts are fitted inside the cylindrical insert one upon another for forming inner peripheral channels and the conical channels for two coating materials.

9. A device according to claim 5 or 8, wherein the size of each peripheral throttle slot is adjustable in accordance with the coating material to be fed.

10. A device according to claim 9, wherein the size of the throttle slot is adjustable by varying the axial position of the orifice parts.

* * * * *